(12) United States Patent
Oohashi et al.

(10) Patent No.: US 7,552,791 B2
(45) Date of Patent: Jun. 30, 2009

(54) STRADDLE-TYPE VEHICLE

(75) Inventors: Satoshi Oohashi, Shizuoka (JP); Takao Kurita, Shizuoka (JP); Hiroshi Shirayanagi, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 344 days.

(21) Appl. No.: 11/550,326

(22) Filed: Oct. 17, 2006

(65) Prior Publication Data

US 2007/0089923 A1    Apr. 26, 2007

(30) Foreign Application Priority Data

Oct. 20, 2005    (JP)    ............................. 2005-306269

(51) Int. Cl.
*B62J 23/00*    (2006.01)
(52) U.S. Cl. ...................................... 180/219; 180/68.3
(58) Field of Classification Search ................. 180/219, 180/229, 68.1; 280/276, 279, 280, 288.4
See application file for complete search history.

(56) References Cited

U.S. PATENT DOCUMENTS

| 7,094,267 B2 * | 8/2006 | Inayama | ..................... 55/385.3 |
| 2001/0009213 A1 * | 7/2001 | Nakamura | ................... 188/26 |
| 2001/0043147 A1 * | 11/2001 | Yamada et al. | ......... 340/870.11 |

FOREIGN PATENT DOCUMENTS

| JP | 5-155371 | * | 6/1993 |
| JP | 2002-513713 |  | 5/2002 |

* cited by examiner

*Primary Examiner*—Anne Marie M. Boehler
(74) *Attorney, Agent, or Firm*—Hogan & Hartson LLP

(57) ABSTRACT

A straddle-type vehicle that exactly detects temperature of air sucked into the engine while protecting an intake temperature sensor of a fuel injector from damage. A front fork supports a front wheel rotatably. An engine is arranged rearward of the front fork to produce a driving force. A Zeichen plate protects the intake temperature sensor. The intake temperature sensor is arranged forwardly of an upper rear end of the front fork, and the Zeichen plate is arranged forwardly of the intake temperature sensor.

8 Claims, 6 Drawing Sheets

[Fig. 1]
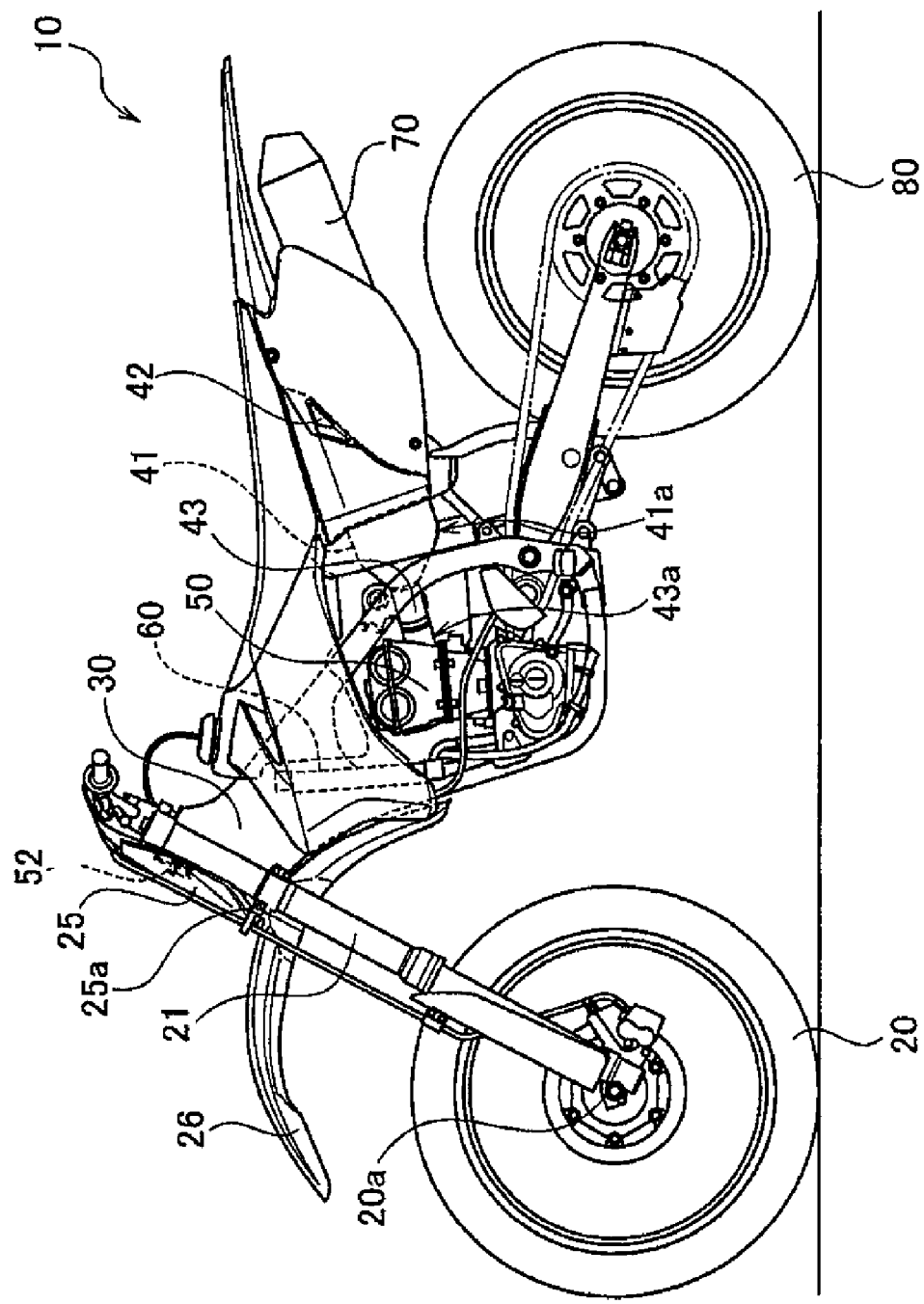

[Fig. 2]
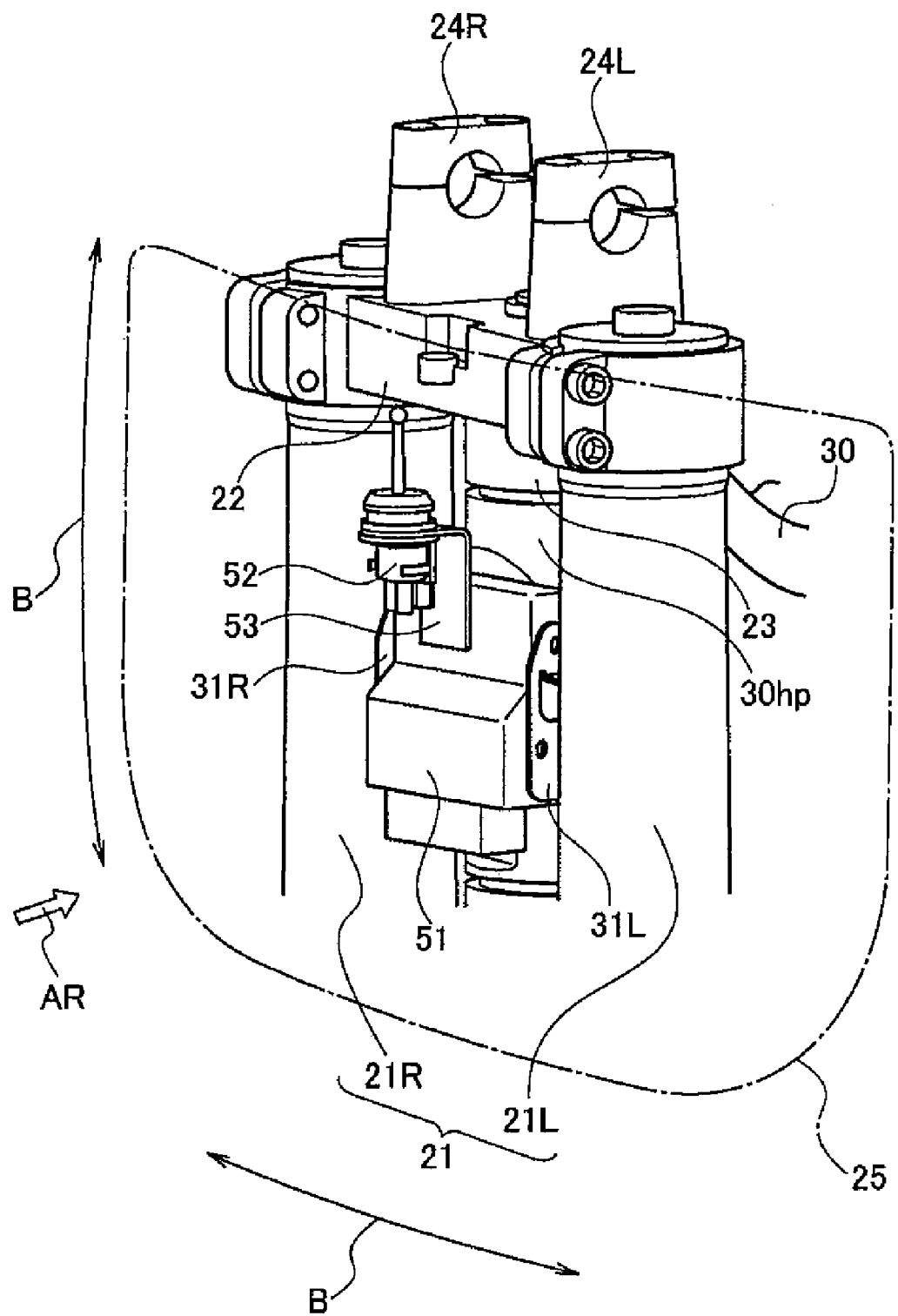

[Fig. 3]
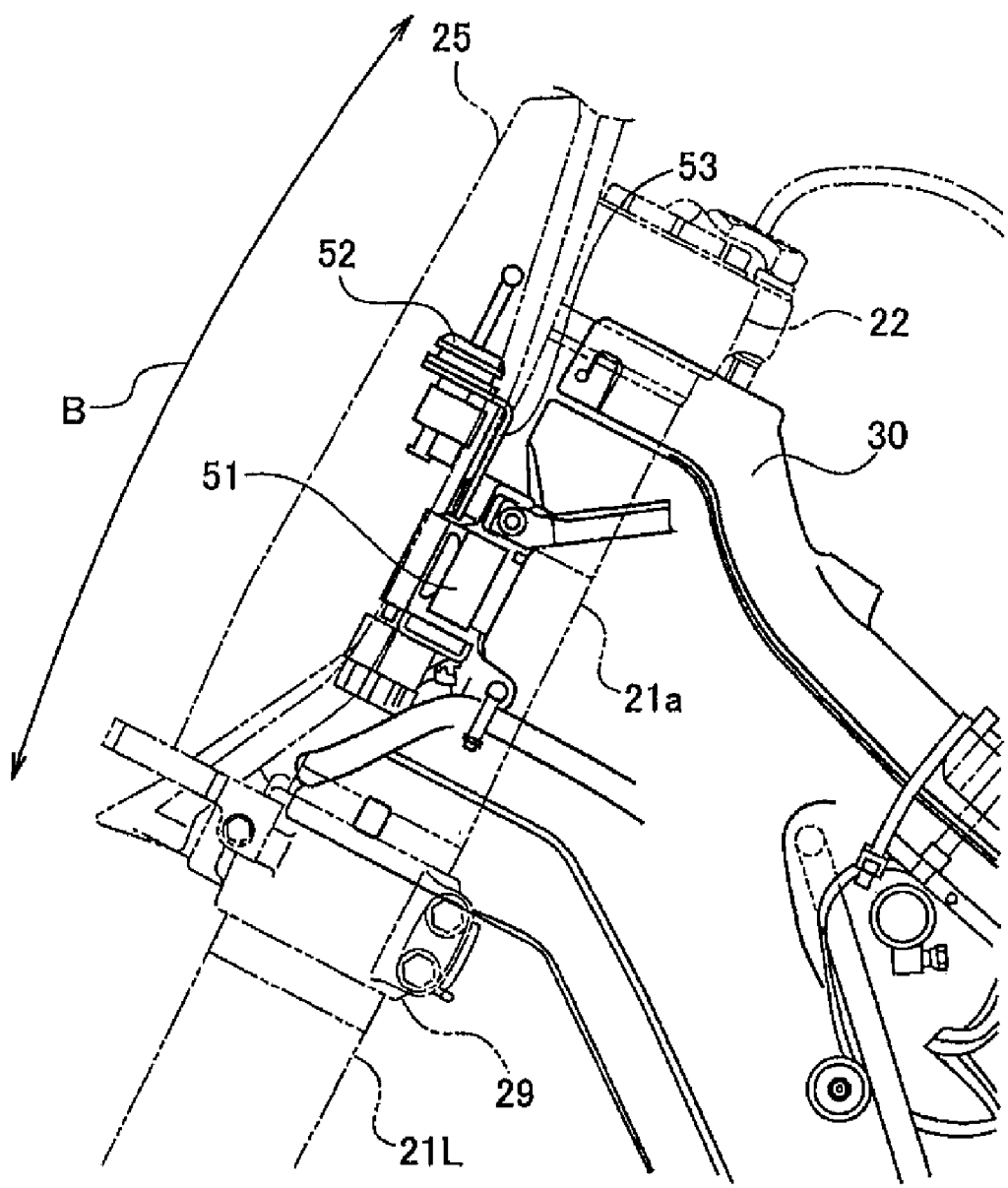

[Fig. 4]
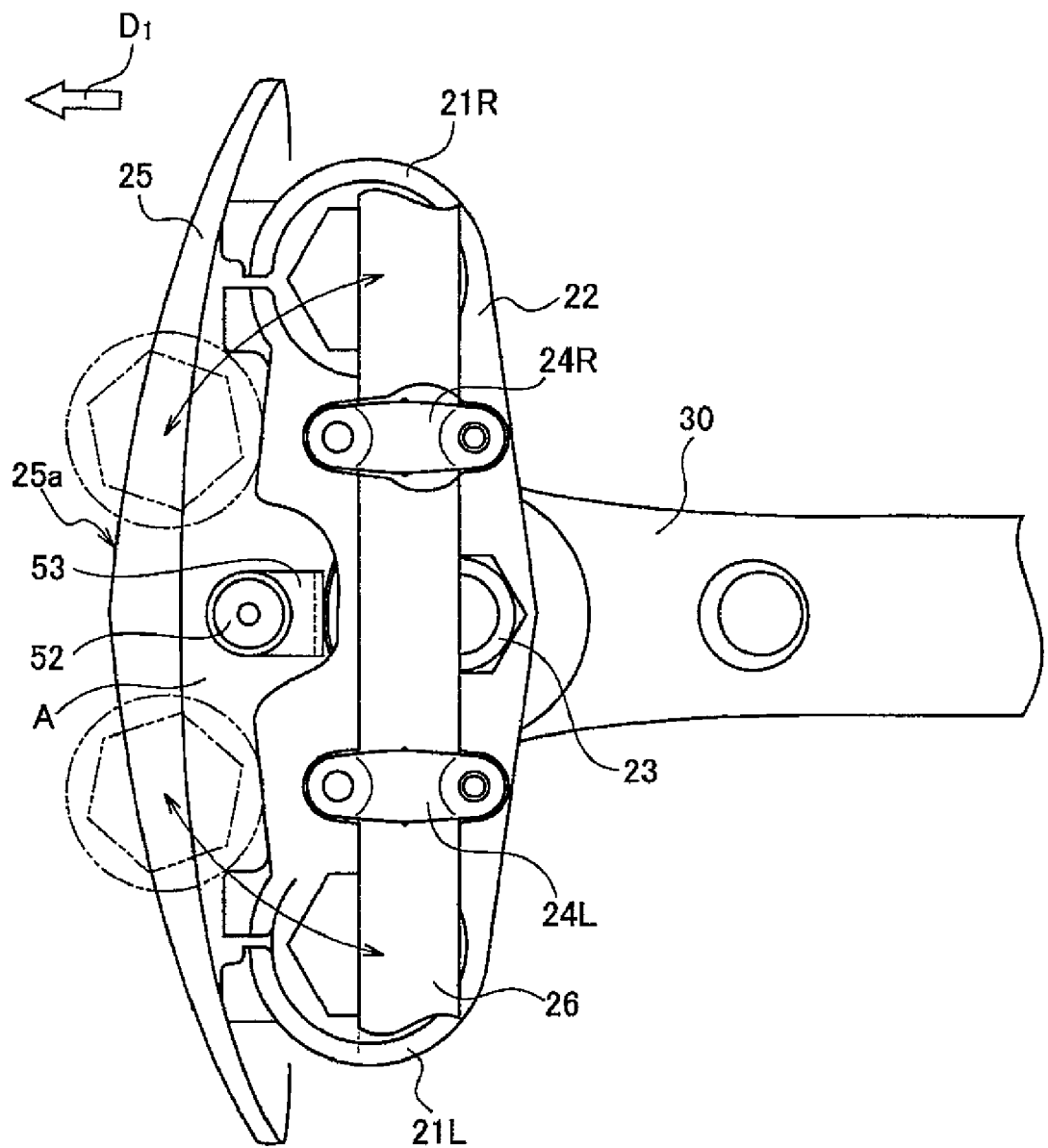

[Fig. 5]
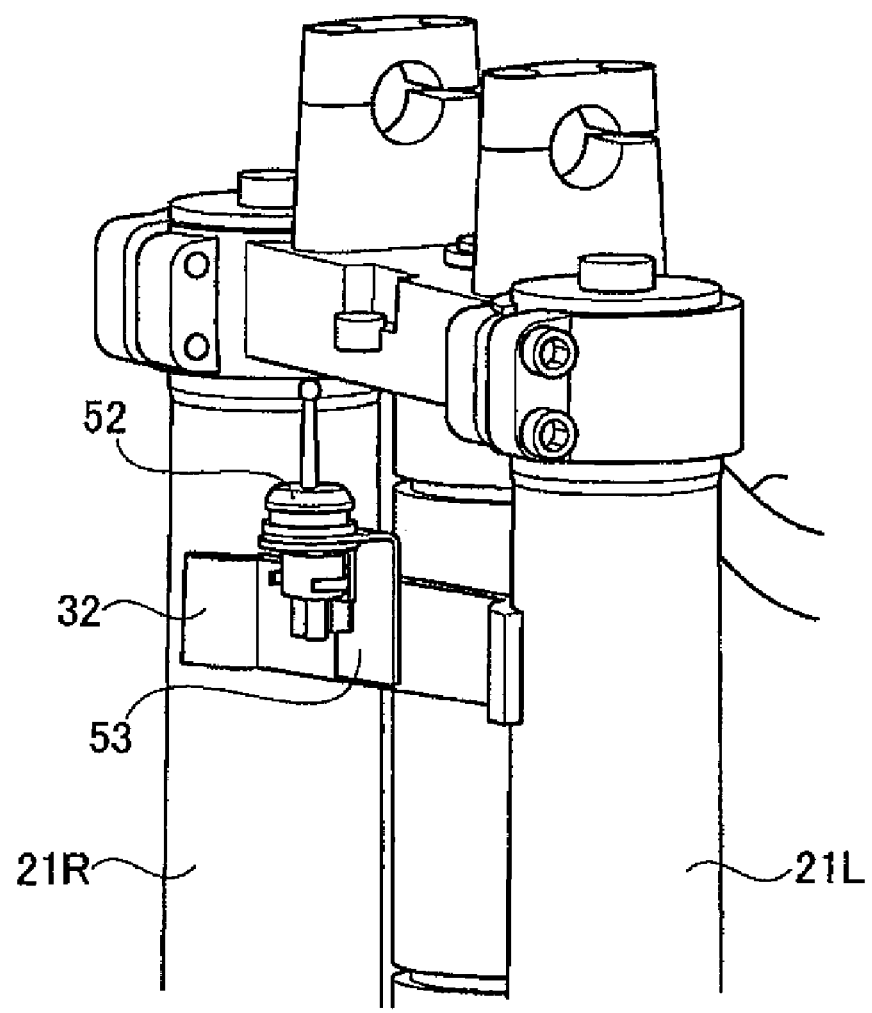

[Fig. 6]
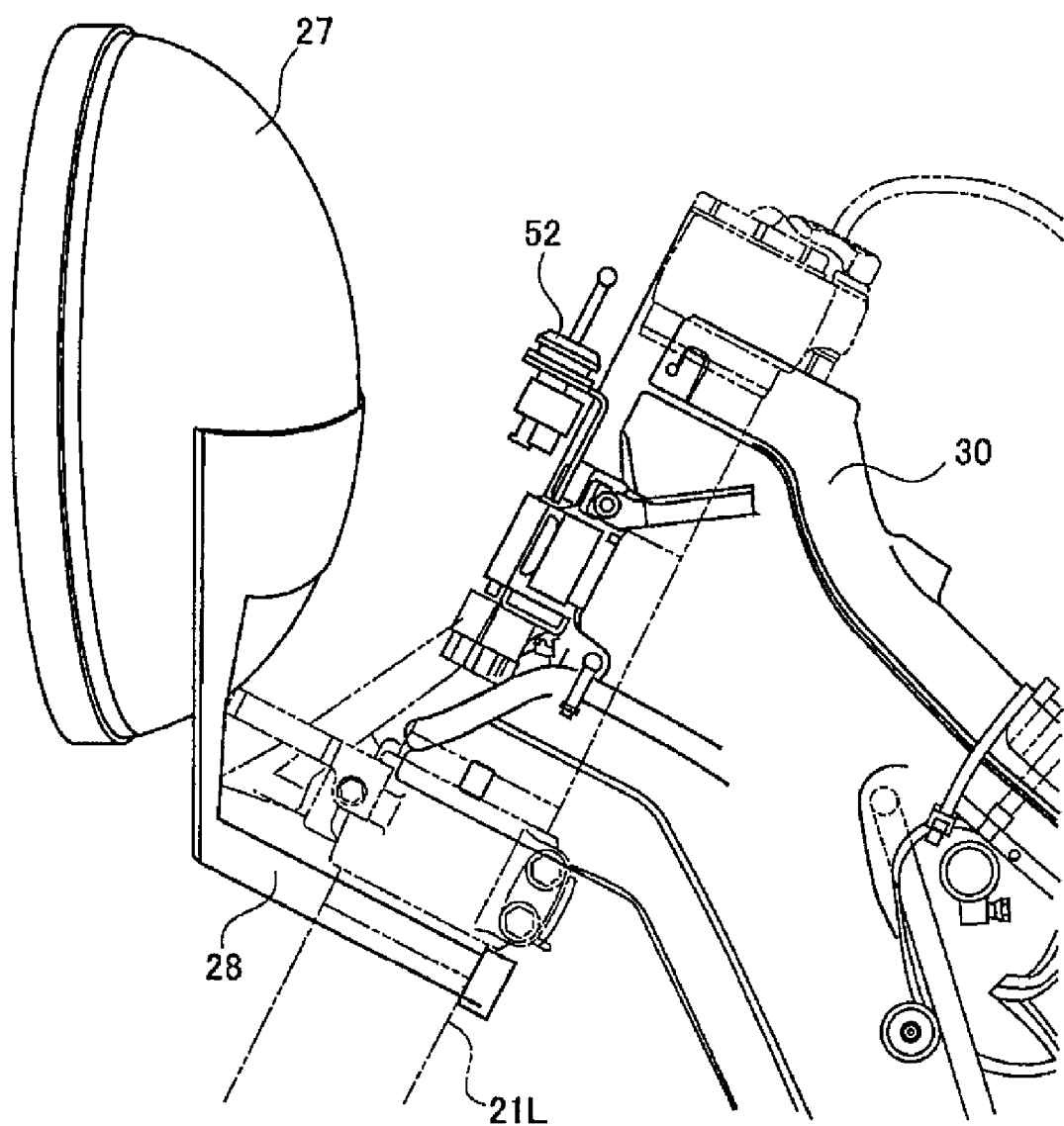

STRADDLE-TYPE VEHICLE

RELATED APPLICATIONS

This application claims the benefit of priority under 35 USC 119 of Japanese patent application no. 2005-306269, filed on Oct. 20, 2005, which application is hereby incorporated by reference in its entirety.

BACKGROUND OF THE INVENTION

1. Field of the Invention

The present invention relates to a straddle-type vehicle and, more particularly, relates to an intake temperature sensor that detects temperature of air sucked into an engine of an off-road straddle-type.

2. Description of Related Art

In recent years, electronically controlled fuel injectors have been adopted in straddle-type vehicles optimized for traveling on rough terrain, that is, so-called off-road straddle-type vehicles. In straddle-type vehicles provided with such fuel injector, an intake temperature sensor and an air pressure sensor are provided to measure air quantity sucked into the engine.

The intake temperature sensor and air pressure sensor are generally arranged in the vicinity of a throttle body, for example, in an air cleaner taking into consideration exact measurement of an air quantity sucked into an engine (see JP-T-2002-513713, pages 38-39, FIG. 19).

Since the intake temperature sensor is influenced by heat generated from the engine and exhaust system, the temperature detected by the intake temperature sensor is higher than the atmospheric temperature. Thus, the temperature detected by the intake temperature sensor must be appropriately corrected.

However, there is a problem in that it is difficult to perfectly correct the temperature detected by the intake temperature sensor and it is therefore not possible to detect the exact atmospheric temperature.

While such problem may be solved by keeping the intake temperature sensor away from heat generating sources such as the engine, this causes a further problem in that the temperature sensor is exposed to and may be damaged by mud, water, pebbles, and other objects and debris while traveling.

The probability of such damage is particularly high in off-road straddle-type vehicles traveling over rough terrain. However, since delicate control of the throttle is important in off-road straddle-type vehicles, there is a keen demand for exact measurement of the air quantity sucked into the engine.

SUMMARY OF THE INVENTION

The invention has been thought of in view of this situation and provides a straddle-type vehicle capable of exactly detecting the temperature of air sucked into the engine while protecting the intake temperature sensor from damage.

A straddle-type vehicle according to the invention comprises a front fork that supports a front wheel rotatably, an engine arranged rearward of the front fork to produce a driving force, and an intake temperature sensor that detects the temperature of air sucked into the engine. A sensor protective part (for example, a Zeichen plate) protects the intake temperature sensor. The intake temperature sensor is arranged forwardly of an upper rear end of the front fork, and the sensor protective part is arranged forwardly of the intake temperature sensor.

With the intake temperature sensor arranged forwardly of the upper rear end of the front fork, that is, in a relatively high position, mud, water, pebbles, and other flying objects and debris encountered while traveling are prevented from striking the intake temperature sensor, which is susceptible to shocks.

Also, the sensor protective part is arranged forwardly of the intake temperature sensor, so that travel wind does not strike directly against the intake temperature sensor. Therefore, it is possible to exactly detect the atmospheric temperature of air sucked into the engine.

Further, since the intake temperature sensor is kept away from heat generating sources such as the engine, there is no need for correction of detected intake temperatures, which is necessary in conventional intake temperature sensors arranged in the vicinity of the engine.

With such the sensor protective part it is possible to protect the intake temperature sensor from damage from flying objects while traveling.

Another feature of the invention is that the front fork comprises a pair of fork portions that support a rotating shaft end of the front wheel, and a steering shaft is arranged substantially in parallel to the pair of fork portions as viewed in a plan view of the vehicle. The front fork can turn about the steering shaft, and the intake temperature sensor is arranged in a region defined by turning the pair of fork portions about the steering shaft.

Another feature of the invention is that the intake temperature sensor is arranged forwardly of the engine as viewed from a side of the vehicle.

Another feature of the invention is a radiator arranged forwardly of the engine to cool a cooling water of the engine by the use of travel wind. The intake temperature sensor is arranged forwardly of the radiator as viewed in from the side of the vehicle.

Another feature of the invention is an exhaust part (for example, a muffler) connected to the engine to guide gases discharged from the engine. The intake temperature sensor is arranged forwardly of the exhaust part as viewed in from the side of the vehicle.

Another feature of the invention is a throttle body adjacent to the engine to adjust an air quantity sucked into the engine. The intake temperature sensor is arranged above a lower end of the throttle body as viewed from the side of the vehicle.

Another feature of the invention is an intake part connected to the throttle body to guide air sucked into the engine. The intake temperature sensor is arranged above a lower end of the intake part as viewed from the side of the vehicle.

In another of the invention, the sensor protective part comprises a Zeichen plate that discriminates the vehicle. A front surface of the Zeichen plate is substantially perpendicular to a traveling direction of the vehicle, and the intake temperature sensor is arranged in a range of the front surface as viewed from the front of the vehicle.

Another feature of the invention is a head pipe that supports the steering shaft rotatably, a handle crown arranged on an upper portion of the head pipe, and an under-bracket arranged on a lower portion of the head pipe. The Zeichen plate is arranged forwardly of and covers a region between the handle crown and the under-bracket as viewed from the front of the vehicle, and the intake temperature sensor is arranged in the region.

According to the invention, a straddle-type vehicle that exactly detects the temperature of air sucked into the engine while protecting an intake temperature sensor from damage is provided.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a motorcycle according to the invention.

FIG. 2 is a perspective view showing a front fork and an intake temperature sensor of the motorcycle of FIG. 1.

FIG. 3 is a left side view showing the front fork and intake temperature sensor of FIG. 2.

FIG. 4 is a plan view showing the front fork and intake temperature sensor of FIG. 2.

FIG. 5 is a perspective view showing a front fork according to a modification of the invention.

FIG. 6 is a left side view of the front fork of FIG. 5.

DETAILED DESCRIPTION OF THE INVENTION

An embodiment of a straddle-type vehicle according to the invention is now described with reference to the drawings. The same or similar parts in the figures are denoted by the same or similar reference numerals.

It should be kept in mind that the drawings are schematic and that ratios of respective dimensions may be different from actual ones. Specific dimensions should be determined taking the following description into consideration.

FIG. 1 is a left side view of a motorcycle 10 embodying a straddle-type vehicle according to the invention. Motorcycle 10 includes a front wheel 20 and a rear wheel 80. A driving force generated by an engine 50 drives rear wheel 80.

Motorcycle 10 is a so-called off-road straddle-type vehicle optimized for traveling on rough terrain. Engine 50 is preferably a 4-cycle engine arranged rearward of a front fork 21. Engine 50 is provided with a fuel injector, which comprises a throttle body 43, an engine control unit (ECU) 51 (see FIG. 2), and an intake temperature sensor 52.

Front fork 21 supports front wheel 20, specifically, supports a rotating shaft end 20a rotatably. Also, front fork 21 moves (linearly moves) front wheel 20 vertically (actually, in a direction, to which a predetermined caster angle is imparted) according to changes in road surface conditions to absorb shocks applied to front wheel 20.

Intake temperature sensor 52 is arranged forwardly of front fork 21 to detect temperature of air sucked into engine 50.

A Zeichen plate 25 is arranged forwardly of intake temperature sensor 52. Zeichen plate 25 is a plate-shaped resin part representative of a number by which motorcycle 10 is discriminated in play (for example, motocross).

Zeichen plate 25 is mounted to front fork 21 through a mount 25a.

A vehicle body frame 30 forms a skeleton of motorcycle 10 and mounts thereto a steering shaft 23 (see FIG. 2) connected to front fork 21, engine 50, etc.

An air cleaner 41 is connected to throttle body 43 to purify outside air taken in from an air intake port 42. Air cleaner 41 includes an intake manifold (not shown) up to throttle body 43 through which air sucked into engine 50 is guided.

Throttle body 43 is connected to engine 50 to adjust the air quantity sucked into engine 50 according to a signal output from ECU 51 (see FIG. 2) on the basis of an opening degree of a throttle mounted to a handle bar 26 (see FIG. 4).

A radiator 60 is arranged forwardly of engine 50 to cool water that cools engine 50 by use of travel wind. Radiator 60 is connected to engine 50 to circulate cooling water between engine 50 and radiator 60.

A muffler 70 is connected to engine 50 through an exhaust manifold (not shown) to lessen the exhaust sound gases discharged from engine 50 to the outside. Muffler 70 (and the exhaust manifold) constitutes an exhaust part.

An explanation is now given to front fork 21 including intake temperature sensor 52. FIGS. 2 and 3 show front fork 21 and intake temperature sensor 52. Zeichen plate 25 is omitted from FIG. 2.

Front fork 21 comprises a left fork 21L and a right fork 21R (a pair of fork portions). Left fork 21L supports rotating shaft end 20a (see FIG. 1) of front wheel 20. Right fork 21R supports the other rotating shaft end (not shown) of front wheel 20 on the right side surface of motorcycle 10.

Left fork 21L and right fork 21R are connected to each other by a handle crown 22 arranged on an upper portion of a head pipe 30hp and an under-bracket 29 arranged on a lower portion of head pipe 30hp.

Mounted to handle crown 22 (and under-bracket 29) is steering shaft 23 supported rotatably on head pipe 30hp. Front fork 21 is able to turn about steering shaft 23.

Steering shaft 23 is arranged substantially in parallel to and between left fork 21L and right fork 21R.

Handle holders 24L, 24R are mounted to handle crown 22. Handle holders 24L, 24R hold handle bar 26 (see FIG. 4).

ECU 51 and intake temperature sensor 52 constitute the fuel injector as described above. ECU 51 is connected to throttle body 43, intake temperature sensor 52, an air pressure sensor (not shown), a fuel injection valve provided on throttle body 43, etc.

ECU 51 measures (calculates) an air quantity sucked into engine 50 on the basis of intake temperature detected by intake temperature sensor 52 and intake air pressure detected by the air pressure sensor. Further, ECU 51 determines an air/fuel ratio according to an opening degree of a throttle and the measured air quantity to adjust the quantity of fuel jetted from the fuel injection valve.

ECU 51 is fixed to brackets 31L, 31R. Bracket 31L is mounted to an inner side of left fork 21L. Likewise, bracket 31R is mounted to an inner side of right fork 21R. ECU 51 is arranged in a space between left fork 21L and right fork 21R and fixed to front fork 21 (i.e., to left fork 21L and right fork 21R).

Intake temperature sensor 52 is fixed to ECU 51 through bracket 53. As shown in FIG. 3, intake temperature sensor 52 is arranged forwardly of an upper rear end 21a of front fork 21 (i.e., left fork 21L and right fork 21R).

Zeichen plate 25 is arranged forwardly of intake temperature sensor 52 and constitutes a sensor protective part that protects intake temperature sensor 52 from mud, water, pebbles, and other flying objects and debris while traveling.

As shown in FIG. 1, intake temperature sensor 52 is arranged forwardly of engine 50 and radiator 60 as viewed in a side view of motorcycle 10. Intake temperature sensor 52 is arranged forwardly of muffler 70 (including the exhaust manifold). That is, intake temperature sensor 52 is arranged forwardly of such heat generating sources.

Also, intake temperature sensor 52 is arranged above a lower end 43a of throttle body 43 and a lower end 41a of air cleaner 41 as viewed from the side of motorcycle 10. That is, intake temperature sensor 52 is arranged above such heat generating sources.

FIG. 4 is a plan view showing front fork 21 and intake temperature sensor 52. As shown in FIG. 4, intake temperature sensor 52 is arranged in a region A defined within the turning paths of left fork 21L and right fork 21R about steering shaft 23.

Thus, intake temperature sensor 52 is arranged in a position free of interference with left fork 21L and right fork 21R even when a rider manipulates handle bar 26 to move left fork 21L and right fork 21R to the positions indicated imaginary lines in FIG. 4.

The plate-shaped front surface 25a of Zeichen plate 25 is arranged substantially perpendicular to a traveling direction $D_1$ of motorcycle 10 to protect intake temperature sensor 52 from mud, water, pebbles and other flying objects and debris while traveling.

As shown in FIGS. 2 and 3, Zeichen plate 25 is arranged forwardly of handle crown 22 and under-bracket 29 and covers a region B between handle crown 22 and under-bracket 29 as viewed from the front of motorcycle 10 (i.e., when viewed in the direction of arrow AR in FIG. 2). Intake temperature sensor 52 is arranged in region B.

Also, as shown in FIG. 4, intake temperature sensor 52 is arranged in a range of front surface 25a of Zeichen plate 25 as viewed from the front of motorcycle 10.

According to this embodiment, intake temperature sensor 52 is arranged forwardly of upper rear end 21a of front fork 21, that is, intake temperature sensor 52 is arranged in a relatively high position and is protected from mud, water, pebbles and other flying objects and debris encountered during travel of motorcycle 10.

A lower position is not preferable since there is a possibility of immersion in mud or water when motorcycle 10 is used off-road. Further, a more rearward position is not preferable since it will increase proximity to heat generated by engine 50.

The sensor protective part is arranged forwardly of the intake temperature sensor, so that travel wind does not strike directly against the intake temperature sensor. Therefore, it is possible to exactly detect the atmospheric temperature of air sucked into engine 50.

Since intake temperature sensor 52 is kept away from heat generating sources such as engine 50, there is no need to correct detected intake temperatures, as is necessary in conventional intake temperature sensors arranged near the engine. Also, deterioration of sensor 52 from the heat of engine 50 is minimized.

In motorcycle 10, Zeichen plate 25 protects intake temperature sensor 52 from damage caused by mud, water, pebbles and other flying objects and debris encountered while traveling.

In motorcycle 10, intake temperature sensor 52 is arranged in region A defined by turning left fork 21L and right fork 21R about steering shaft 23. Therefore, it is possible to protect intake temperature sensor 52 while also avoiding interference with steering of front wheel 20.

Further, flying objects and debris encountered while traveling have difficulty in entering region A defined by left fork 21L, right fork 21R, and Zeichen plate 25, that is, the space in which intake temperature sensor 52 is arranged.

This arrangement is particularly advantageous when motorcycle 10 is used off-road and frequently washed, since the possibility of energetic water at the time of washing striking against intake temperature sensor 52 is decreased.

In motorcycle 10, intake temperature sensor 52 is arranged in region B defined by Zeichen plate 25, that is, in the range of Zeichen plate 25 as viewed from the front of motorcycle 10.

Also, the plate-shaped front surface 25a of Zeichen plate 25 is arranged substantially perpendicular to traveling direction $D_1$ of motorcycle 10.

Therefore, it is possible to further surely protect intake temperature sensor 52 from mud, water, pebbles, etc. while traveling. Since Zeichen plate 25 protects intake temperature sensor 52, it is not necessary to provide a separate protective member for intake temperature sensor 52, thus reducing the number of parts of motorcycle 10.

While the invention has been described with reference to an embodiment of the invention, the invention is not so limited. Various modifications and substitutions to the described embodiments will be apparent to those skilled in the art and are within the scope of the invention.

For example, while according intake temperature sensor 52 has been described as mounted to ECU 51 as shown in FIG. 2, such arrangement may be modified as shown in FIG. 5.

Specifically, intake temperature sensor 52 may be fixed to a bracket 32 mounted to left fork 21L and right fork 21R.

Also, while Zeichen plate 25 has been described as a sensor protective part, a headlight unit 27 for illumination in a traveling direction of motorcycle 10 may also constitute a sensor protective part as shown in FIG. 6.

Headlight unit 27 is fixed to left fork 21L and right fork 21R by a bracket 28.

Further, while intake temperature sensor 52 has been described as arranged in region A defined by turning left fork 21L and right fork 21R about steering shaft 23, intake temperature sensor 52 may not necessarily be arranged in region A.

Also, while motorcycle 10 has been described primarily as an off-road straddle-type vehicle, the invention can of course be applied to straddle-type vehicles other than off-road vehicles.

In this manner, the invention includes various embodiments not described herein. Accordingly, the technical scope of the invention is determined only by the following claims.

The particular embodiments of the invention described in this document should be considered illustrative, rather than restrictive. Modification to the described embodiments may be made without departing from the spirit of the invention as defined by the following claims.

The invention claimed is:

1. A straddle vehicle comprising:
   a front fork that supports a front wheel rotatably;
   an engine arranged rearward of the front fork to produce a driving force;
   an intake temperature sensor that detects temperature of an air sucked into the engine; and
   a sensor protective part that protects the intake temperature sensor, wherein
   the intake temperature sensor is arranged forwardly of an upper rear end of the front fork,
   the sensor protective part is arranged forwardly of the intake temperature sensor,
   the front fork comprises a pair of fork portions that support a rotating shaft end of the front wheel,
   a steering shaft is arranged between and substantially in parallel to the pair of fork portions,
   the front fork turns about the steering shaft, and
   the intake temperature sensor is arranged in a region defined by turning the pair of fork portions about the steering shaft.

2. The straddle vehicle according to claim 1, wherein the intake temperature sensor is arranged forwardly of the engine as viewed in side view of the straddle vehicle.

3. The straddle vehicle according to claim 1, further comprising:
   a radiator arranged forwardly of the engine to cool a cooling water of the engine by the use of travel wind,
   wherein the intake temperature sensor is arranged forwardly of the radiator as viewed from a side of the straddle vehicle.

4. The straddle vehicle according to claim 1, further comprising:
   an exhaust part connected to the engine to guide gases discharged from the engine,
   wherein the intake temperature sensor is arranged forwardly of the exhaust part as viewed from a side of the straddle vehicle.

5. The straddle vehicle according to claim 1, further comprising:
   a throttle body connected to the engine to adjust an air quantity sucked into the engine,
   wherein the intake temperature sensor is arranged above a lower end of the throttle body as viewed from a side of the straddle vehicle.

6. The straddle vehicle according to claim 5, further comprising:
   an intake part connected to the throttle body to guide air to the throttle body, and
   wherein the intake temperature sensor is arranged above a lower end of the intake part as viewed from the side of the straddle vehicle.

7. A motorcycle comprising the straddle vehicle of claim 1.

8. A straddle vehicle comprising:
   a front fork that supports a front wheel rotatably;
   an engine arranged rearward of the front fork to produce a driving force;
   an intake temperature sensor that detects temperature of an air sucked into the engine;
   a sensor protective part that protects the intake temperature sensor;
   a head pipe that supports a steering shaft rotatably;
   a handle crown arranged on an upper portion of the head pipe; and
   an under-bracket arranged on a lower portion of the head pipe, wherein
   the intake temperature sensor is arranged forwardly of an upper rear end of the front fork,
   the sensor protective part is arranged forwardly of the intake temperature sensor,
   the sensor protective part comprises a plate that discriminates the straddle vehicle,
   a front surface of the plate is substantially perpendicular to a traveling direction of the straddle vehicle,
   the intake temperature sensor is arranged in a range of the front surface as viewed from a front of the straddle vehicle,
   the plate is arranged forwardly of and covers a region between the handle crown and the under-bracket as viewed from the front of the straddle vehicle, and
   the intake temperature sensor is arranged in the region.

* * * * *